Figure 1:
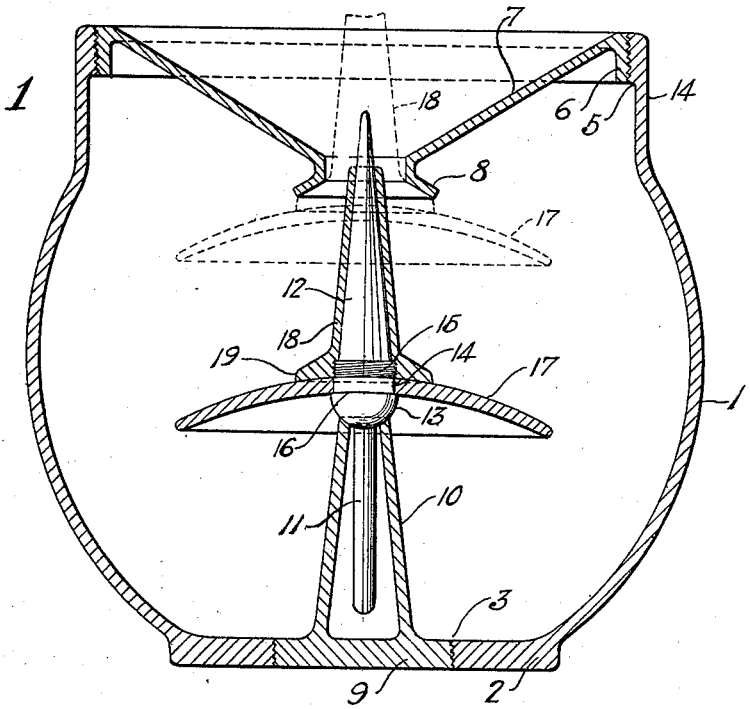

W. PYZIKOWSKI.
CHECK VALVE FOR CUSPIDORS.
APPLICATION FILED OCT. 2, 1911.

1,015,069.

Patented Jan. 16, 1912.

WITNESSES:

INVENTOR.
W. PYZIKOWSKI.
BY
ATTORNEYS.

UNITED STATES PATENT OFFICE.

WALENTY PYZIKOWSKI, OF ELIZABETH, PENNSYLVANIA.

CHECK-VALVE FOR CUSPIDORS.

1,015,069. Specification of Letters Patent. Patented Jan. 16, 1912.

Application filed October 2, 1911. Serial No. 652,403.

*To all whom it may concern:*

Be it known that I, WALENTY PYZIKOWSKI, a subject of the Czar of Russia, residing at Elizabeth, in the county of Allegheny and State of Pennsylvania, have invented certain new and useful Improvements in Check-Valves for Cuspidors, of which the following is a specification, reference being had therein to the accompanying drawing.

This invention relates to check valves for cuspidors and the objects of my invention are, first, to furnish a cuspidor with a simple and inexpensive check valve for closing the funnel-shaped mouth-piece of the cuspidor when the same is accidentally tilted or upset; second, to provide a cuspidor that can be easily cleaned and maintained in a sanitary condition; third, to provide a cuspidor consisting of comparatively few parts easily and quickly assembled, and fourth, to provide a cuspidor that can be advantageously used in hotels, depots, and other public places.

I attain the above objects by a mechanical construction that will be hereinafter specifically described and then claimed, and reference will now be had to the drawing, wherein:—

Figure 2:
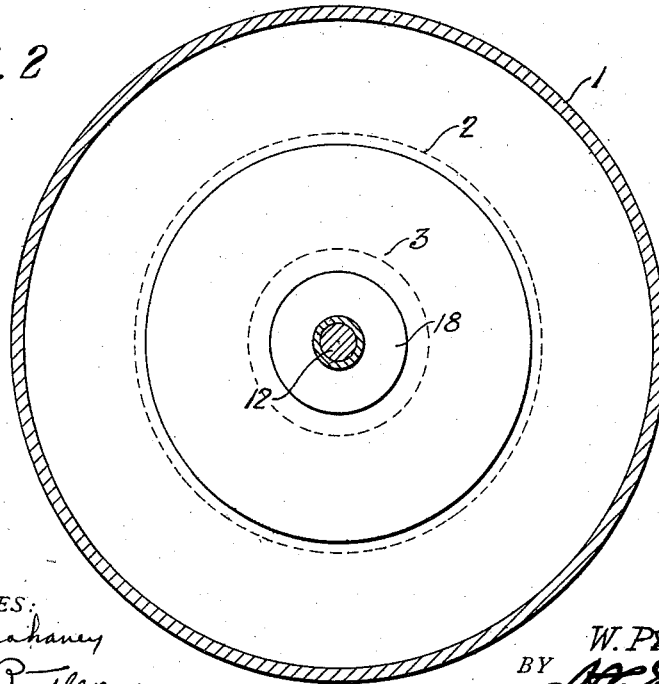

Figure 1 is a vertical sectional view of the cuspidor, and Fig. 2 is a horizontal sectional view of the same.

A cuspidor in accordance with this invention comprises a receptacle 1 having a flat bottom 2 provided with a central vertical opening 3 the walls of which are screw threaded. The upper edge of the receptacle 1 terminates in a neck 4 having the inner walls thereof screw threaded, as at 5 to receive the annular depending exteriorly screw threaded flange 6 of a funnel-shaped mouth-piece 7, said mouth-piece extending into the neck 2 and having the lower end thereof provided with an annular flange 8 constituting a valve seat.

Detachably mounted in the opening 3 is a plug 9 having a hollow conical-shaped pedestal 10 serving functionally as a guide for the depending end 11 of a conical-shaped stem 12. The lower end of the stem 12 is rounded or semi-spherical, as at 13, reduced as at 14 and screw threaded, as at 15. The rounded end 13 of the stem normally rests upon the upper end of the pedestal 10 and mounted upon the annular shoulder 16 of the stem is a convexo-concave deflector 17, preferably circular in plan. This deflector is retained upon the reduced and shouldered portion of the stem by a conical-shaped valvular member 18 screwed upon the threaded portion 15 of the stem 12. The member 18 snugly fits upon the stem 12 and has the lower end thereof provided with an annular flange 19 adapted to hold the deflector 17 and adapted to engage the flange 8, when the cuspidor is tilted or up-set.

When liquid or solid matter is deposited in the funnel-shaped mouth-piece 7 of the cuspidor, the liquid or solid matter is deflected to the sides of the receptacle and thereby prevented from accumulating centrally of the receptacle. When the cuspidor is upset the valvular member 18 immediately closes the funnel-shaped mouth-piece 7 and prevents the contents of the cuspidor from being spilled.

Through the medium of the detachable plug 9 and the funnel-shaped mouth-piece 7 the interior of the receptacle 1 can be easily and quickly cleansed and maintained in a sanitary condition.

What I claim is:—

In a cuspidor, a receptacle having a flat bottom provided with an opening, a funnel-shaped mouth-piece detachably mounted in the upper end of said receptacle, an annular flange carried by the lower end of said mouth-piece and providing a valve seat, a plug detachably mounted in the opening in the bottom of said receptacle, a hollow pedestal carried by said plug, a conical-shaped stem having the lower end thereof extending into said pedestal with the central portion thereof rounded to rest upon the said pedestal, said stem having an annular shoulder and a threaded portion, a deflector mounted upon the annular shoulder of said stem, and a valvular member screwed upon the threaded portion of said stem and having an annular flange adapted to seat upon the lower end of said funnel-shaped mouth-piece, substantially as, and for the purpose herein described.

In testimony whereof I affix my signature in the presence of two witnesses.

WALENTY PYZIKOWSKI.

Witnesses:
 MAX H. SROLOVITZ,
 T. DURLED.

Copies of this patent may be obtained for five cents each, by addressing the "Commissioner of Patents, Washington, D. C."